Patented Sept. 23, 1952

2,611,710

UNITED STATES PATENT OFFICE 2,611,710

COMPOSITION FOR HARD FACING

Herbert J. Woock, Alhambra, Calif.

No Drawing. Application December 17, 1949,
Serial No. 133,670

12 Claims. (Cl. 106—1)

This invention relates to an improved hard facing composition by which a hard metallic coating or facing can be applied to steel articles to protect them from abrasive wear. This application is a continuation-in-part of my copending application, Serial No. 643,761, filed January 26, 1946, now abandoned.

A primary object of the invention is to provide a hard facing composition that can be easily and quickly applied over the surface of a steel article to be hard faced and which will enable the facing to be of the desired thickness or thinness at will. In many types of tools the article to be hard faced is relatively thin and this is particularly true if the hard facing is to be applied adjacent a sharp or beveled edge. Heretofore, many hard facings have been applied by welding onto the tool to be hard faced, a hard facing alloy. However, if the tool is thin where the hard facing is to be applied the welding procedure is apt to burn through the tool in effecting adequate penetration to secure the desired bond between the welded-on alloy and the metal of the tool. The improved composition enables a hard facing that is very thin to be applied under such circumstances without danger of burning through the body of the tool. While the composition is highly advantageous in applying thin layers or coatings of hard facing material, it is not restricted thereto and enables a hard facing layer of any reasonable thickness to be applied when desired.

Another object of the invention is to provide a hard facing composition which can be controlled and varied at will to produce a hard facing having the desired characteristics of hardness and abrasive resistance.

In its simplified and preferred form the composition embodying the present invention consists of a mixture of two prepared alloys and a flux. I first prepare one alloy from the following ingredients in approximately the following proportions by weight:

| | Per cent |
|---|---|
| Cobalt | 10 |
| Ferrochromium (50%–70% chromium) | 42 |
| Ferromanganese (70%–85% manganese) | 18 |
| Boron | 10 |
| Ferrosilicon (80%–90% silicon) | 10 |
| Ferromolybdenum (50%–75% molybdenum) | 10 |
| Total | 100 |

These ingredients are mixed together, melted in a crucible, and poured into pigs, and the resulting alloy is then crushed and pulverized to particles of 60 mesh and smaller sizes.

I prepare a second alloy of the following ingredients in approximately the following proportions by weight:

| | Per cent |
|---|---|
| Nickel | 80 |
| Ferrosilicon (80%–90% silicon) | 20 |
| Total | 100 |

These ingredients are also mixed together, melted in a crucible and poured into pigs, and crushed to approximately 60 mesh particles and finer sizes.

The final composition used consists of approximately 84% of the first alloy, above described, 10% of the second alloy above described, and 6% of a flux. Practically any flux used in welding may be employed for this purpose which will perform the function of preventing oxidation of the molten metal and cause impurities to surface so that they may be removed on the completion of the hard facing as slag. The flux employed should also possess the property of acting as an adhesive for adhesively fastening the particles of the alloy to the base steel that is to be hard surfaced. A preferred flux consists of the following:

| | Per cent |
|---|---|
| Diatomaceous earth | 4⅙ |
| Borax | 52½ |
| Boric acid | 26⅔ |
| Calcium chloride | 16⅔ |

The percentage of the flux is a percentage based on the weight of the entire metal and flux, that is, the 6% of flux employed constitutes six parts per cent by weight of the entire composition.

The mixture of the two alloys and the flux may be mixed in a dry state and may be kept in stock. At the time of use water is added to the mixture and it is violently agitated so as to hold as long as possible the metal alloy particles and the flux ingredients in suspension. The amount of water added is dependent to some extent upon the thickness of the hard facing that is to be applied. If the hard facing is to be very thin, considerable water is added so that the paste produced will be thin enough to spread readily over the surface to be hard faced. If a thicker hard facing is desired, less water is employed so that the paste will be somewhat thicker and can be applied as a thick coating. By maintaining the paste in a violently agitated condition up to the time that it is applied to the tool, a fairly even distribution of the particles of the two alloys and the flux can be obtained. The tool that is thus coated is then dried or baked to remove all of the moisture. I prefer to place the tool in an oven and dry it at a temperature of approximately 300° to 400° F. for a few minutes. When it is completely dried the flux acts somewhat as a mechanical adhesive attaching the particles of the alloys to the tool so that they will not be dislodged therefrom in the course of handling.

The applied coating of the paste which has been thus dried is then fused. This may be accomplished by playing on the coating the flame of an oxy-acetylene torch or the flame of an atomic hydrogen torch. In some situations a carbon arc may also be employed. If the tool is extremely thin or there are other considerations making it advantageous to do so, the tool may be placed in a furnace and heated until the applied coating fuses. When the paste fuses it will be found to be evenly distributed over the area to which it has been applied and on cooling it will produce a hard wear-resisting surface firmly attached to the base metal of the tool. If the base metal of the tool is thereafter to undergo heat treatment, this may be accomplished without disturbing or affecting the hard facing produced.

I have found that other fluxing ingredients may be used in lieu of calcium chloride; thus lithium chloride, magnesium chloride, and other metal chlorides that I have tried seem to perform substantially the same function as calcium chloride. I have also employed in lieu of calcium chloride, potassium carbonate, sodium carbonate, and calcium carbonate, and while the results employing the carbonates are not quite as good as when calcium chloride is used they are nevertheless satisfactory.

In some instances I find it advantageous to add to the flux an organic burnable adhesive such as for example gum arabic. Any other organic adhesive can be employed in lieu thereof which will serve to adhesively fasten the metal particles to the base metal so that they will not become dislodged therefrom during handling after the baking operation. Such organic adhesive when employed merely burns out of the composition in the course of final fusing. The use of the organic adhesive, however, is not essential as in a large percentage of instances the drying of the flux during the baking operation causes the flux to function as the adhesive in temporarily bonding the alloy particles to the base metal.

It will, of course, be appreciated that when the metal ingredients and the flux are mixed with water the metallic ingredients tend to quickly settle unless violently agitated. It is possible to introduce into the composition along with the flux a suspending agent which will tend to keep the metallic particles in suspension. Kaolin (china clay) may be used for this purpose, and in the above described composition the diatomaceous earth functions in this manner to some extent. In the course of the final fusing these suspending agents rise to the surface of the metal while it is in a molten condition and enter or form the slag thereon which can be removed such as by a wire brush.

When it is desired to vary the hardness and some of the characteristics of the hard facing that is applied, a hard metal carbide can be added to the composition. Tungsten carbide, molybdenum carbide, and titanium carbide are all suitable. These carbides, if employed, should be pulverized to 60 mesh and finer, and any proportion of metal carbide can be added from a trace up to 200% by weight of the composition.

The hardness of the composition resulting from the fusing varies to a large extent in direct proportion to the amount of the hard metal carbide that is added. Thus, if a substantial amount of hard metal carbide is added, the hardness and abrasive resistance of the hard facing is substantially greater than where only a trace of carbide is added.

Where a hard metal carbide is added it is usually desirable to increase the amount of flux to compensate therefor and to maintain the flux in the proportion of about 6% by weight of the entire metallic composition including the hard metal carbide. Also, when a hard metal carbide is added it is usually desirable to add more of the second alloy which predominates in nickel. The hard metal carbide tends to raise the melting point of the composition but the addition of the nickel tends to compensate for this by lowering the melting point so that the melting point of the entire composition will remain approximately the same.

In the composition of the two metal alloys above described, the ferrosilicon ingredients is introduced primarily to render the resulting alloy brittle or friable so that it may be crushed or pulverized after having been poured into pigs. While the nickel ingredients in the second alloy could be added directly to the first alloy and alloyed therewith, I find that if this is done the alloy resulting from such a mixture of ingredients has a high melting point or fusing temperature. If the ingredients of the first alloy as above given are melted, pigged, and pulverized separately, and the ingredients of the second alloy are separately melted, pigged, and pulverized, and thereafter added, the paste produced, when subjected to fusing temperature has a lower melting point in that the nickel and ferrosilicon, being alloyed together, tend to melt at a lower temperature. The first described alloy seems to dissolve therein and a fusing of the entire composition to take place at a lower temperature than would be the case if all ingredients were melted together in a single alloy, pigged, and pulverized, and used to form the paste. The use of cobalt and boron in the first alloy above described may be regarded as optional but their presence is desirable.

By hard facing a steel tool by means of this composition and in accordance with the method described herein, a hard facing can be applied at a temperature below the melting point of the tool. The fusing temperature of the composition is at or below the sweating temperature of the average steel that is used for ordinary tools. Consequently, when the fusing is caused to take place in a furnace the body of the tool will not melt or burn through even though the tool may be extremely thin. The thickness of the hard facing is controlled by controlling the thickness of the paste applied to the tool.

The ingredients that enter into the first alloy above described may be varied in amount to a considerable extent. Thus they may vary through approximately the following ranges:

| | Per cent |
|---|---|
| Cobalt | 0 to 20 |
| Ferrochromium | 32 to 52 |
| Ferromanganese | 13 to 23 |
| Boron | 0 to 20 |
| Ferrosilicon | 5 to 15 |
| Ferromolybdenum | 6 to 15 |

In the second alloy the ferrosilicon content may be varied from 15% to 25% and the nickel ingredient adjusted accordingly. The composition of the flux can be varied both as to the nature of the ingredient and its quantity greatly inasmuch as virtually any common flux used in welding can be employed and reasonably satisfactory results secured. The relative proportions of the first alloy and the second prior to the addition of hard metal carbide, if this is employed, can also be varied. Thus, the amount of the first alloy employed in the final composition may be raised or lowered above and below 84% as much as 10% either way at the expense of the second alloy and the flux. In a similar manner, the nickel-ferrosilicon alloy may constitute more or less than 10% of the final composition. The percentages given, however, have proven satisfactory and for these reasons these percentages are set forth herein as indicative of the most satisfactory manner in which the present composition may be compounded.

Various changes may be made in the details of the composition without departing from the spirit and scope of the invention as defined by the appended claims, wherein I claim:

1. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42% ferrochromium, about 18% ferromanganese, about 10% boron, about 10% ferrosilicon, and about 10% ferromolybdenum; the second alloy resulting from the melting, pigging, and crushing of about 80% nickel, and about 20% ferrosilicon.

2. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42% ferrochromium, about 18% ferromanganese, about 10% boron, about 10% ferrosilicon, and about 10% ferromolybdenum; the second alloy resulting from the melting, pigging, and crushing of about 80% nickel, and about 20% ferrosilicon, and to which is added up to 200% by weight of the foregoing composition of a hard metal carbide from the group consisting of tungsten carbide, molybdenum carbide and titanium carbide.

3. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42% ferrochromium, about 18% ferromanganese, about 10% boron, about 10% ferrosilicon, and about 10% ferromolybdenum; the second alloy resulting from the melting, pigging, and crushing of about 80% nickel, and about 20% ferrosilicon, and a small amount of a heat destructible organic adhesive agent sufficient to cause the particles to adhere to the metal to be faced.

4. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42% ferrochromium, about 18% ferromanganese, about 10% boron, about 10% ferrosilicon, and about 10% ferromolybdenum; the second alloy resulting from the melting, pigging, and crushing of about 80% nickel, and about 20% ferrosilicon, the flux including a small amount of an agent for assisting the maintaining of said alloys in suspension in water.

5. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42% ferrochromium, about 18% ferromanganese, about 10% boron, about 10% ferrosilicon, and about 10% ferromolybdenum; the second alloy resulting from the melting, pigging, and crushing of about 80% nickel, and about 20% ferrosilicon, and to which is added a small amount of clay for assisting in maintaining said alloys in suspension in water.

6. A composition for producing a metallic hard facing comprising a mixture of two alloys and a flux in the proportion of about 84% of the first alloy, 10% of the second alloy, and approximately 6% of the flux, the first alloy resulting from the melting, pigging, and crushing of ferrochromium 32 to 52%, ferromanganese 13 to 23%, ferrosilicon 5 to 15%, and ferromolybdenum 6 to 15%, the second alloy resulting from the melting, pigging, and crushing of about 80% nickel and 20% ferrosilicon.

7. A composition for producing a metallic hard facing comprising a mixture of two alloys and a flux in the proportion of about 84% of the first alloy, 10% of the second alloy, and approximately 6% of the flux, the first alloy resulting from the melting, pigging, and crushing of ferrochromium 32 to 52%, ferromanganese 13 to 23%, ferrosilicon 5 to 15%, and ferromolybdenum 6 to 15%, the second alloy resulting from the melting, pigging, and crushing of about 80% nickel and 20% ferrosilicon, the above ingredients being crushed to 60 mesh and finer.

8. A composition for producing a metallic hard facing comprising a mixture of two alloys and a flux of the type used in welding in the proportion of about 84% of the first alloy, 10% of the second alloy, and 6% of the flux, the first alloy resulting from the melting, pigging, and crushing of a mixture comprising about 10% cobalt, about 42 ferrochromium, about 18% ferromanganese, about 10% boron, about 10% ferrosilicon, and about 10% ferromolybdenum; the second alloy resulting from the melting, pigging, and crushing of about 80% nickel, and about 20% ferro silicon, the above ingredients being crushed to 60 mesh and finer.

9. A composition for producing a metallic hard facing comprising a mixture of two alloys, a flux, and additional hard metal carbides in the proportion of from a trace to 60% of hard metal carbides, 10% of an alloy resulting from the fusion of 80% nickel and 20% ferrosilicon, 6% of the flux and the remainder of the composition composed of an alloy resulting from the fusion of about 10% cobalt, 42% ferrochromium, 18% ferromanganese, 10% boron, 10% ferrosilicon, and 10% ferromolybdenum, all in a finely powdered, crushed condition capable of passing through a 60 mesh screen.

10. A composition for producing a metallic hard facing comprising a mixture of two alloys, an addition of a hard metal carbide and a flux in the proportions of from a trace to 60% hard metal carbides and 6% of the flux and the balance consisting of about 84% of an alloy comprising about 10% cobalt, 42% ferrochromium, about 18% ferromanganese, about 10% boron about 10% ferrosilicon, about 10% ferromolybdenum and 10% of an alloy comprising about 80% nickel and about 20% ferrosilicon, all crushed to fineness of at least 60 mesh screen size and mixed in powdered form.

11. A composition for producing a metallic hard facing comprising a mixture of two alloys and a flux of the type used in welding metal in the proportion of from 74% to 94% of the first alloy and from 6% to 26% of the second alloy and remainder the flux, the first alloy resulting from the melting, pigging and crushing of a mixture comprising about 10% cobalt, about 42% ferrochromium, about 18% ferromanganese, about 10% boron, about 10% ferrosilicon, and about 10% ferromolybdenum, the second alloy resulting from the melting, pigging and crushing of about 80% nickel and about 20% ferrosilicon, the above ingredients being crushed to 60 mesh and finer.

12. A composition for producing a metallic hard facing comprising a mixture of two alloys a flux of the type used in welding, an additional hard metal carbides in the proportions of from a trace to 60% of hard metal carbides, 6% of flux, and the remainder comprising two alloys of from 74% to 94% of the first alloy and from 6% to 26% of the second alloy, the first alloy resulting from the melting, pigging and crushing of ferrochromium 32 to 52%, ferromanganese 13 to 23%, ferrosilicon 5 to 15%, ferromolybdenum 6 to 15%, and the second alloy resulting from the melting, pigging and crushing of about 80% nickel and 20% ferrosilicon, the above ingredients being crushed to 60 mesh and finer.

HERBERT J. WOOCK.

No references cited.